United States Patent [19]

Kamijo et al.

[11] Patent Number: 4,655,503
[45] Date of Patent: Apr. 7, 1987

[54] VEHICULAR SEAT

[75] Inventors: Ken Kamijo, Zushi; Kenzo Shimizu; Hiroshi Ueno, both of Yokosuka, all of Japan

[73] Assignee: Nissan Motor Company, Ltd., Japan

[21] Appl. No.: 682,595

[22] Filed: Dec. 14, 1984

[30] Foreign Application Priority Data

| Dec. 19, 1983 | [JP] | Japan | 58-237872 |
| Dec. 19, 1983 | [JP] | Japan | 58-237873 |
| Dec. 19, 1983 | [JP] | Japan | 58-237874 |

[51] Int. Cl.$^4$ .................. B60N 1/12; B60R 21/10
[52] U.S. Cl. .................. 297/238; 297/103; 297/117; 297/232; 297/464; 297/216
[58] Field of Search ............ 297/238, 117, 103, 94, 297/216, 232, 464, 467, 383

[56] References Cited

U.S. PATENT DOCUMENTS

| 2,738,829 | 3/1956 | Rowe | 297/103 |
| 3,951,450 | 4/1976 | Gambotti | 297/238 |
| 4,230,366 | 10/1980 | Ruda | 297/487 |
| 4,274,674 | 6/1981 | Deloustal | 297/250 |
| 4,322,052 | 3/1982 | Hodge et al. | 297/94 X |
| 4,368,916 | 1/1983 | Blasin | 297/383 |

FOREIGN PATENT DOCUMENTS

| 0003354 | 8/1979 | European Pat. Off. . | |
| 0009439 | 7/1982 | European Pat. Off. . | |
| 7216625 | 5/1972 | Fed. Rep. of Germany . | |
| 2720954 | 10/1977 | Fed. Rep. of Germany | 297/232 |
| 2917798 | 12/1979 | Fed. Rep. of Germany . | |
| 3019153 | 12/1981 | Fed. Rep. of Germany . | |
| 3215488 | 11/1983 | Fed. Rep. of Germany | 297/238 |
| 2307673 | 11/1976 | France | 297/238 |
| 58-87631 | 6/1983 | Japan . | |
| 2023415 | 1/1980 | United Kingdom . | |

*Primary Examiner*—James T. McCall
*Attorney, Agent, or Firm*—Lowe, Price, LeBlanc, Becker & Shur

[57] ABSTRACT

A seat back of a vehicular seat is movably supportable in the fore and aft direction relative to a seat cushion and lockable in its forward and rearward positions. The back side of the seat back serves as a part of a seat for a child in the forward position in which the child is restrained relative to the seat back by a seat belt assembly, while the front side of the seat back serves as a part of a usual passenger seat in the rearward position, thereby providing a sufficient comfortableness to the seated child without deteriorating the function of the usual passenger seat.

29 Claims, 32 Drawing Figures

VEHICULAR SEAT

BACKGROUND OF THE INVENTION

1. Field of the Invention

This invention relates in general to a vehicular seat configuration, and more particularly to an improvement of the vehicular seat of the type wherein a seat back is used at its back side as a part of a seat for a child.

2. Description of the Prior Art

In connection with a vehicular front seat, for example, of an automotive vehicle, it has been already proposed to use the back side of a seat back as a part of a seat for a child in which a seat plate is pivotally fixed to the back side of the seat back to be retractable. A child is seated on the seat plate facing rearward and restrained by belts in position. However, the following difficulties have encountered in the thus configurated seat: For example, the seat back is conversely inclined for the child seated on the seat plate. No ample space is formed between the seated child and a passenger seated on a rear seat, thereby deteriorating the seated child's comfortableness to be seated. Furthermore, the child seated on the seat plate is out of a driver's ken, and therefore the driver cannot watch the condition of the child.

SUMMARY OF THE INVENTION

A vehicular seat of the present invention comprises a seat back which movably supported in fore and aft direction relative to a seat cushion. The seat back can be locked in forward and rearward positions. The back side of the seat serves as a part of a seat for a child in the forward position of the seat back in which the child is restrained relative to the back side of the seat back by a restraining means such as a seat belt assembly. The front side of the seat back serves as a part of a usual seat for a passenger in the rearward position of the seat back. Accordingly, a sufficient comfortableness is provided to the seated child while putting the child into the driver's ken when used as a seat for the child, without deteriorating the function of the seat when used as a usual seat.

BRIEF DESCRIPTION OF THE DRAWINGS

The features and advantages of the vehicular seat of the present invention will be more clearly appreciated from the following description taken in conjunction with the accompanying drawings in which like reference numerals designate like parts and elements, and in which.

DETAILED DESCRIPTION OF THE INVENTION

Figure 1:
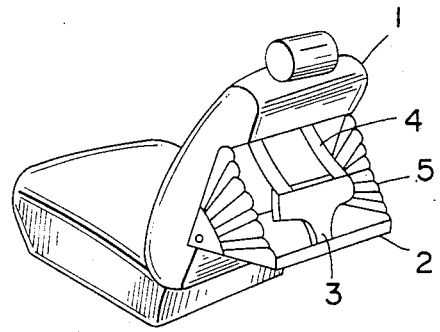
FIG. 1 is a perspective view of a conventional vehicular seat of the type wherein a seat back is used as a part of a seat for the child.

To facilitate understanding the present invention, a brief reference will be made to a conventional seat provided at its seat back with an auxiliary seat for a child, depicted in FIG. 1. Referring to FIG. 1, the conventional seat (front seat) includes a seat back 1 which is provided on its back side (back side in the fore and aft direction of a vehicle) with a seat plate 2 serving as a child's seat or seat for a child. The seat plate 2 is hingedly connected to the back surface of the seat back 1 to take its operative position as shown in FIG. 1 or its inoperative position in which the seat plate 2 is retracted into the back side of the seat back 1. Additionally, an abdominal region supporting member 3, belts 4 and side supporting members 5 are disposed between the seat back 1 and the seat plate 2 to constitute the child's seat. These are usually stored in the seat back together with the seat plate 2 in the inoperative position while are taken out as shown in FIG. 1 when used as the child's seat.

However, the following difficulties have been encountered in the thus configured conventional seat. There is no ample space between the child on the seat plate 2 and a passenger seated on a rear seat, thereby providing an incommodious condition to passengers. Furthermore, there is no place on which the child's legs are placed thereby providing unstable support for the child. Additionally, the backward inclination of the seat back 1 is inconvenient for the seated child in which the child cannot recline on the seat back 1. The above-mentioned no ample space between the seated child and the rear seat passenger give rise to a problem in which the rear seat passenger is liable to easily contact with the child, for example, at vehicle collision and at a sudden deceleration or braking. Vibration of a vehicle body is directly transmitted through the seat back 1 to the seat plate 2, thereby making the seat plate to be uncomfortable to be seated. Moreover, since the child is seated on the back side of the front seat, a driver on a driver's seat or another front seat cannot watch the condition of the child. In addition, the whole weight of the child is applied through the seat plate 2 to the seat back 1, and therefore it is necessary to sufficiently increase the strength of a hinged connection section of the seat plate 2 and the strength of the seat back 1 itself.

Figure 2:
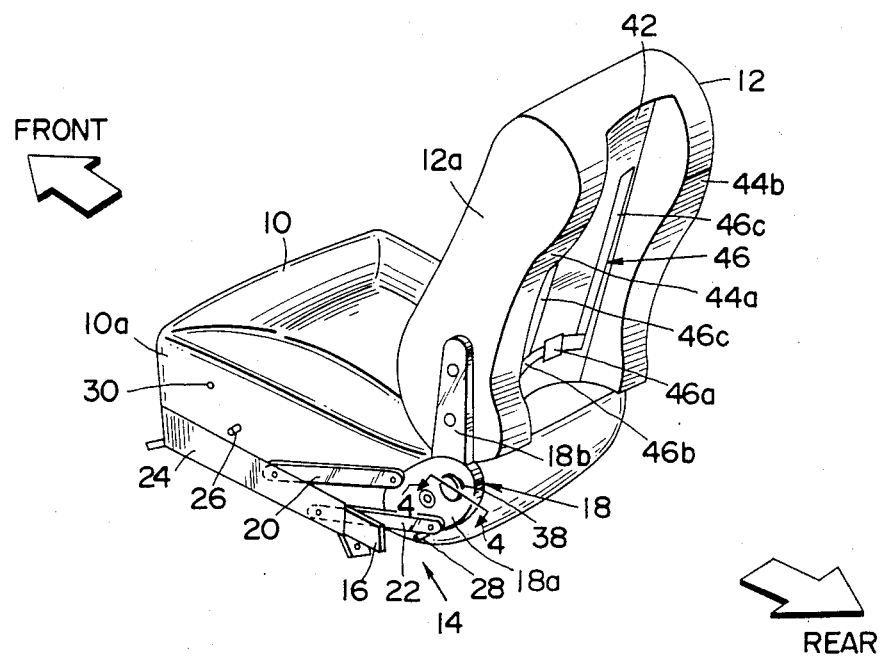
FIG. 2 is a perspective view of a first embodiment of a vehicular seat of the present invention in a usual state.
Figure 3:
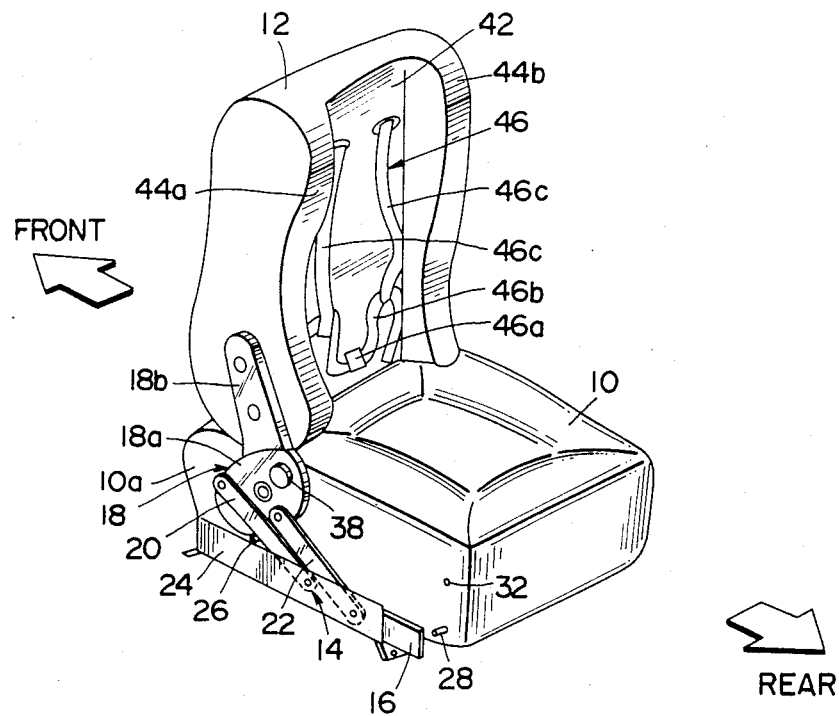
FIG. 3 is a perspective view of the seat of FIG. 2 but showing a state to be used as a seat for a child.
Figure 4:
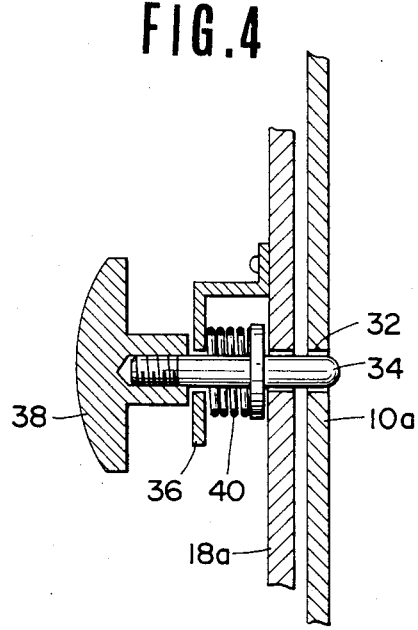
FIG. 4 is a fragmentary sectional view taken in the direction of arrows substantially along the line 4—4 of FIG. 2, showing a mechanism for locking a seat back relative to a seat cushion.

In view of the above description of the conventional seat provided with the child's seat, reference is now made to FIGS. 2, 3 and 4, and more particularly to FIGS. 2 and 3, wherein a first embodiment of a vehicular seat capable of being used as a child's seat, of the present invention is illustrated. In this case, the seat is a front seat of an automotive vehicle, particularly a passenger car. The seat comprises a seat cushion 10 and a seat back 12 as usual. The seat back 12 is movably connected with the seat cushion 10 by means of a support mechanism 14. The support mechanism 14 consists of two link members 20, 22 which are parallely disposed to connect a slide member 16 with a fixed arm or base member 18a of a reclining device 18 for inclining the seat back 12 backward. The slide member 16 is fixedly connected to the side section 10a of the seat cushion 10. The reclining device 18 has a movable arm 18b fixedly connected to the side section 12a of the seat back 12 at the lower part.

Each link member 20, 22 has opposite end sections which are respectively pivotally connected through pins (no numerals) to the slide member 16 and the reclining device fixed arm 18a. The slide member 16 is horizontally movably supported on a guide rail 24 fixed onto the floor of a vehicle body (not shown), thereby enabling the seat cushion 10 to move to a desired position in the fore and aft direction or the direction of longidinal axis of the vehicle body. The reclining device 18 is so arranged that the movable arm 18b can be fixed at a desired angle relative the fixed arm 18a in order to adjust the inclination angle of the seat back 12 relative to the seat cushion 10.

Two stopper members 26, 28 and two holes 30, 32 for fixation are provided on the side section (surface) 10a of the seat cushion 10. The stopper member 28 functions to stop the rotatable movement of the link member 22 in order to fix the link member 22 in a position as shown in FIG. 2, while the stopper member 26 functions to stop the rotational movement of the link member 20 in order to fix the link member 20 in a position as shown in FIG. 3.

The fixed arm 18a of the reclining device 18 is provided with a pin 34 for fixation which pin is shown in detail in FIG. 4. The pin 34 constitutes in cooperation with the fixation holes 30, 32 a locking device for fixing the seat back 12 relative to the seat cushion 10. As shown in FIG. 4, the pin 34 is supported by the fixed arm in such a manner as to be biased rightward in FIG. 4 by means of a spring 40 interposed between the bracket 36 and a spring seat (no numeral) secured to the pin 34. One end section of the pin 34 extends through an opening (no numeral) of the bracket 36 and provided with a knob 38, while the other end section of the same extends through an opening (no numeral) of the fixed arm 18a of the reclining device 18 and projectable into the fixation hole 30, 32. Accordingly, the pin 34 is arranged to be brought into a position corresponding to the fixation hole 32 in a state as shown in FIG. 2 in which the link member 22 is stopped by the stopper member 28, whereas it is arranged to be brought into a position corresponding to the fixture hole 30 in a state as shown in FIG. 3 in which the link member 20 is stopped by the stopper member 26. Thus, the pin 34 can project into or fit in the fixation holes 32, 30 in the states shown in FIGS. 2 and 3, respectively. As a result, the fixed arm 18a of the reclining device 18 and the seat back 12 connected thereto can be securely fixed relative to the seat cushion 10.

The seat back 12 is formed at its back side (surface) with a groove 42 which extends in the longitudinal or vertical direction of the seat back so that the seat back 12 has a generally C-shaped horizontal cross-section to which a longitudinal axis of the seat back is substantially perpendicular, thereby defining side supporting sections 44a, 44b at the opposite side parts of the seat back 12. A seat belt assembly 46 is installed on the bottom surface of the groove 42. The seat belt 46 is made up of a lap belt 46b and two shoulder belts which respectively support the waist and the shoulders of the child. The belt 46b is connected in a line by a buckle 46a. The belts 46c are connected with the belt 46b.

The manner of operation of the thus arranged seat will now be discussed.

In a usual condition in which the seat is not used for the child, the seat back 12 is fixed in the position corresponding to the rear section of the seat cushion 10 as shown in FIG. 2. This is accomplished as follows: The link member 22 is stopped by the stopper member 28 and the pin 34 fits in the fixation hole 32, thereby fixing the seat back 12, which is accomplished by stopping the link member 22 by the stopper member 28 and causing the pin 34 to fit in the fixation hole 32. It will be understood that, in this state, a passenger can be seated on the seat as same as in the usual front seat of the vehicle.

When the seat is used for the child, the seat back 12 is moved as follows: First the knob 38 is pulled to release the pin 34 from the fixation hole 32. Subsequently, the seat back 12 is pushed forward or toward the front section side of the seat cushion 10, so that the link member 20, 22 rotate around the pins connected to the slide member 16. As a result, the seat back 12 is moved from a rearward position indicated in FIG. 2 to a forward position indicated in FIG. 3 in which the link member 20 is stopped by the stopper member 26 and the pin 34 fits in the fixation hole 30. In this state, the child is seated on the seat cushion 10 and restrained in position by the seat belt assembly 46 so that the upper body of the child is supported in the groove 42 of the seat back 12 in which the back of the child is supported on the bottom surface of the groove 42 and the lateral movement of the child is restricted by the side supporting sections 44a, 44b.

Accordingly, the child can be seated on the seat in a stable condition. Since an ample space is provided between the child and a passenger seated on a rear seat (not shown) located rear of the seat on which the child is seated, the child and the passenger on the rear seat are comfortable to ride. Additionally, they are prevented from contacting with each other even at vehicle collision or at sudden deceleration or braking, thereby improving safety for the vehicle passengers. The seated child can recline at the back on the seat back 12, place the legs on the seat back 12, and be subjected to vibration from the vehicle body which vibration has been damped by the seat cushion 10, thereby obtaining the same comfortableness as in usual seats of vehicles. Furthermore, since the seated child is within the driver's ken, the driver can easily watch the child. Moreover, if the seat is set as shown in FIG. 3 in case the child is not seated, the passenger seated on the rear seat can streighten the knees and to use the seat as a leg rest. In case of a vehicle of a two-door type, it is improved to get on the vehicle to be seated on the rear seat and to get off the vehicle to leave the rear seat.

Figure 5:
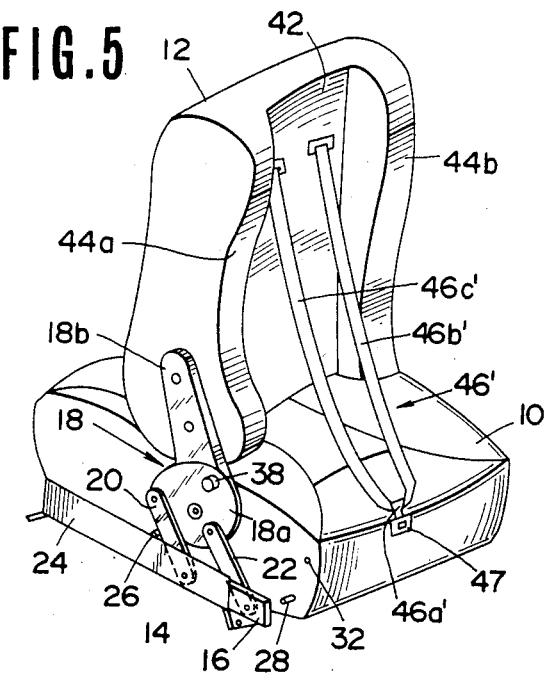
FIG. 5 is a perspective view of a second embodiment of the seat of the present invention.

FIG. 5 illustrate a second embodiment of the seat of the present invention which is similar to the first embodiment except for the arrangement of the seat belt 46' and the fixed position of the seat back 12. In this embodiment, the seat belt assembly 46' includes belts 46b', 46c' whose one end is secured to the upper portion of the back side surface of the seat back 12 while the other end is connected through the backle 46a' to an anchor 47. With this arrangement, when the seat for the child is seated in position, the belt 46b', 46c' can restrain the abdominal region and the shoulders of the child. It is to be noted that, in this embodiment, the location of the stopper member 26 and the fixture hole 30 for the pin 34 is so arranged that the seat back 12 is brought into its fixed position which is located nearly at the central portion of the side section 10a of the seat cushion 10 when the seat back 12 is moved to set the seat for the child. Accordingly, the child can be seated on the rear half of the seat cushion 10 bending the child's knees located near the rest end section of the seat cushion 10.

Figure 6:
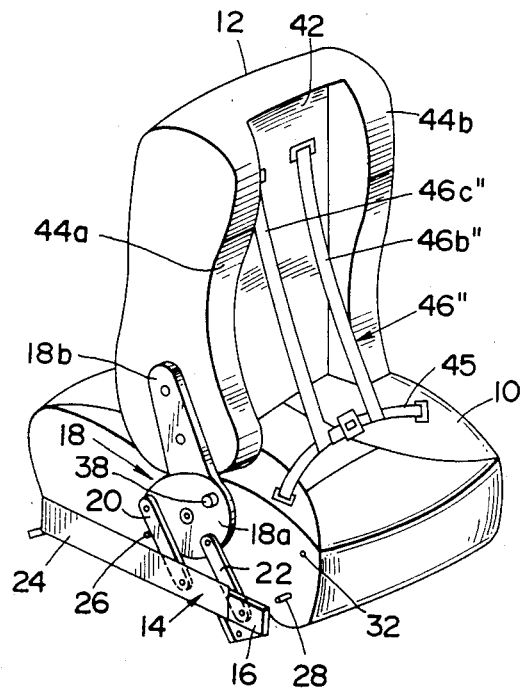
FIG. 6 is a perspective view of a third embodiment of the seat of the present invention.

FIG. 6 illustrates a third embodiment of the vehicular seat of the present invention which is the same as the second embodiment except for the seat belt 46". In this embodiment, the seat belt 46" consists of a lap belt 45 which is connected at its opposite ends with anchors (not shown) which are embedded in the seat cushion 10. The shoulder belts 46b", 46c" are connected at one end thereof with the upper portion of the back side surface of the seat back 12 and at the other end thereof with the lap belt 45.

Figure 7:
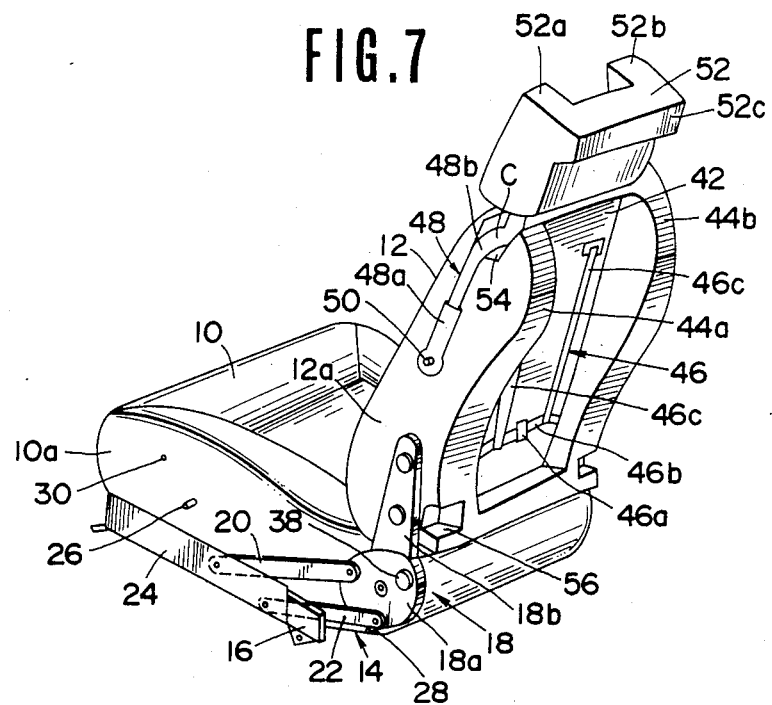
FIG. 7 is a perspective view of a fourth embodiment of the seat of the present invention in a usual state.
Figure 8:
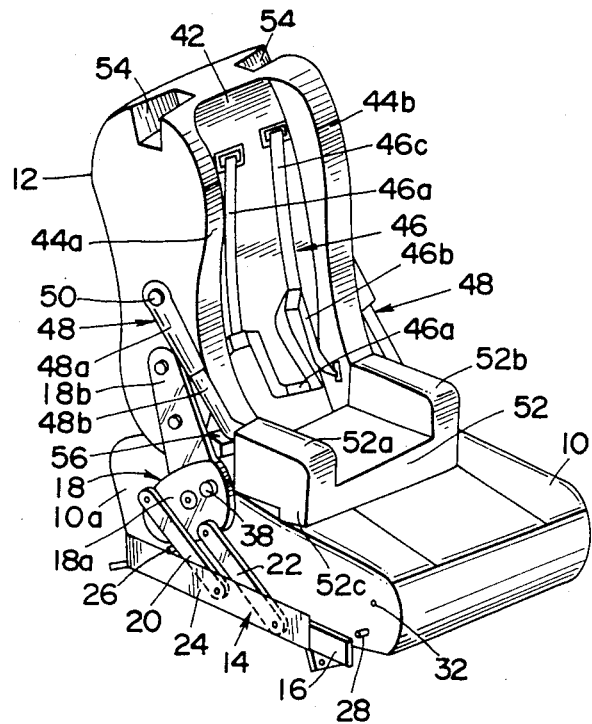
FIG. 8 is a perspective view of the seat of FIG. 7 but showing a state to be used as a seat as a child.

FIGS. 7 and 8 illustrate a fourth embodiment of the seat of the present invention which is similar to the first embodiment except for providing a head rest-child's seat member 52 which serves as both a head rest and a child's seat. The seat of this embodiment consists of the head rest-child's seat member 52 which has side supporting sections 52a, 52b, and a leg section 52c. The side supporting sections 52a, 52b are located opposite so that the member 52 has a generally C-shaped cross-section. The leg section 52c is projected in the opposite direction to the side supporting sections 52a, 52b. The head rest-child's seat member 52 is connected with the opposite side sections 12a of the seat back 12 by means of a pair of extendable levers 48 located at the opposite side sections 12a. Each lever 48 consists of elongate first and second members 48a, 48b which are connected with each other in such a manner that the lever 48 is longitudinally extendable and contractable because the first and second members 48a, 48b are always biased in the direction to contact the lever 48. The first member 45a is pivotally connected at one end thereof with the seat back side section 12a by a pivot 50 secured to the seat back 12 and at the other end thereof with the second member 48b. The second member 48b is connected at one end thereof with the first member 48a and rigidly connected with or inserted into the head rest-child's seat member 52. The second member 48b has a crank-shaped curved section C which is engageable with a groove 54 formed at the top section of the seat back 12 or with a groove 56 formed at the back side surface lower portion of the seat back 12.

With the thus configured seat of the fourth embodiment, in a usual condition in which the seat is not used for the child, the seat back 12 is fixed in the position corresponding to the rear section of the seat cushion 10 as shown in FIG. 7 in which the head rest-child's seat member 52 is fixed in a position above the seat back 12. In this state, a passenger can be seated looking forward as usual, so that the head rest-child's seat member 52 functions as a head rest for the seated passenger upon the lever second member curved section C being engaged with the seat back groove 54, in which the lateral movement of the head of the passenger is restricted by the side supporting sections 52a, 52b.

When the child is to be seated on the seat, the seat back 12 is moved from the position of FIG. 7 to the position of FIG. 8 and fixed therein in the same manner as in the first embodiment of FIGS. 2 and 3. Then, the head rest-child's seat member 52 is pulled up upwardly extending the levers 48 to release the lever second member 48b from the groove 54, and thereafter the levers 48 are rotated downwardly around the pins 50 to bring the head rest-child's seat member 52 to its lower position in which the second member 48b engages with the groove 56 as shown in FIG. 8. In this state, the child is seated on the head rest-child's seat member 52 and restrained in position by the seat belt assembly 46, so that the member 52 functions as a seat for a child. It will be understood that the upper body of the seated child is supported in the groove 42 formed on the back side of the seat back 12, and the waist of the child can be laterally supported by the side supporting sections 52a, 52b of the head rest-child's seat member 52. The leg section 52c of the head rest-child's seat member 52 functions to suitably incline the member 52 to obtain child's stability and comfortableness to be seated. Furthermore, the driver's ken can be prevented from being narrowed, for example, by putting a door mirror out of the driver's ken in the state of FIG. 8 in which the head rest-child's seat member 52 is not located above the seat back 12.

Figure 9:
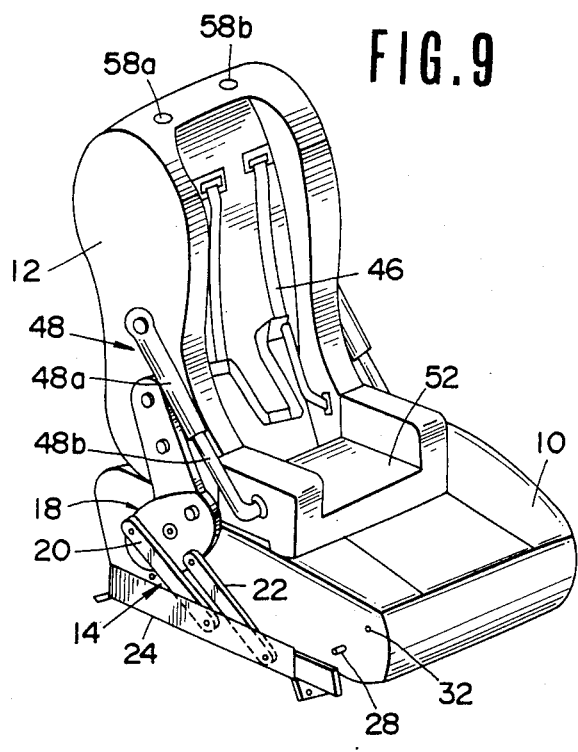
FIG. 9 is a perspective view of a fifth embodiment of the seat of the present invention.

FIG. 9 illustrates a fifth embodiment of the seat of the present invention which is similar to the fourth embodiment except for the fixing manner of the head rest-child's seat member 52 relative to the seat back 12. In this embodiment, the head rest-child's seat member 52 is pivotally connected to the side sections of the seat back 12 by means of the extendable lever 48 whose second member 48b is generally L-shaped without the crank-shaped curved section C as viewed in the fourth embodiment. In this connection, the seat back 12 is not formed with the grooves 54, 56 as viewed in the fourth embodiment. The head rest-child's seat member 52 is provided with two elongate support members (not shown) which are securely connected to the member 52 and projected therefrom to be respectively inserted into two holes 58a, 58b formed at the top section of the seat back 12. Thus, when the seat is not used for the child, the head rest-child's seat member 52 is fixed above the top section of the seat back 12 upon the two elongate support members projected from the member 52 being inserted into the elongate holes 58a, 58b, so that the member 52 serves as a head rest for a passenger seated on the seat in the usual state as indicated in FIG. 7.

Figure 10:
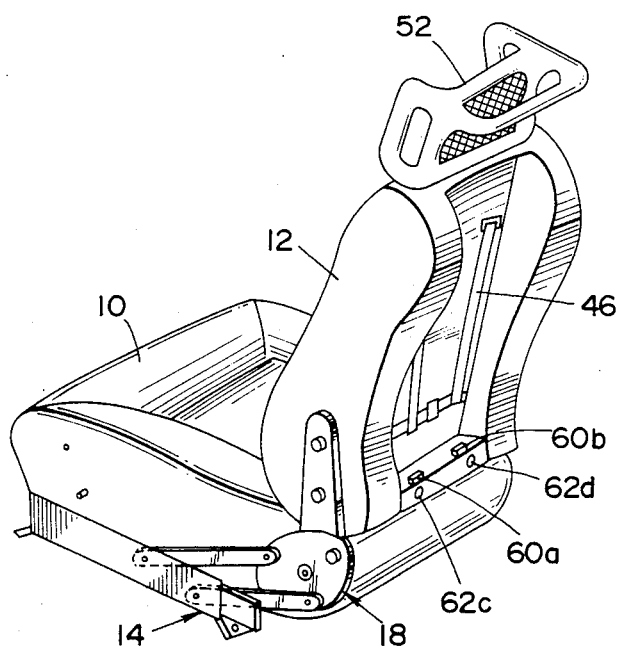
FIG. 10 is a perspective view of a sixth embodiment of the seat of the present invention in a usual state.
Figure 11:
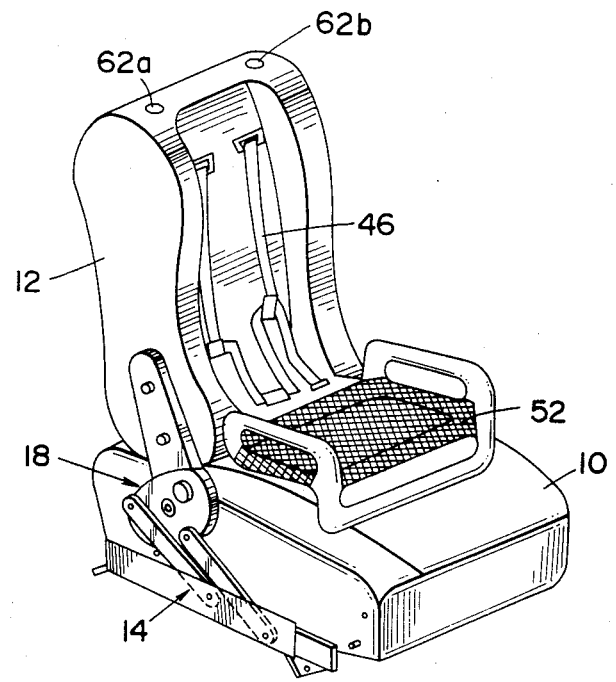
FIG. 11 is a perspective view of the seat of FIG. 10 but showing a state to be used as a seat for a child.
Figure 12:
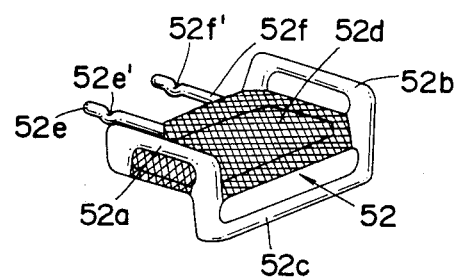
FIG. 12 is a perspective view of a head rest-child's seat member used in the seat of FIGS. 10 and 11.

FIGS. 10, 11 and 12 illustrate a sixth embodiment of the seat of the present invention which is similar to the fourth embodiment of FIGS. 7 and 8 except for the shape of the head rest-child's seat member 52 and the fixing manner thereof relative to the seat back 12. The head rest-child's seat member 52 of this embodiment consists of a skeltal frame (no numeral) formed with the side supporting sections 52a, 52b, and the leg section 52c. A net 52d is put up between the side supporting sections 52a, 52b. The frame is further formed with two elongate support members 52e, 52f which are parallelly disposed and projected to be inserted into two holes 62a, 52b formed at the top section of the seat back 12 as shown in FIG. 11. Additionally, the seat back 12 is further formed at its back side surface lower portion with two holes 62c, 62d into which the two elongate support members 52e, 52f are insertable. It is to be noted that a ratchet mechanism (not shown) is provided in the innermost portion of each hole 62c, 62d so that the ratchet mechanism can engage with a groove 52e', 52f' of the support member 52e, 52f. Knobs 60a, 60b are provided to release the ratchet mechanism from the support member grooves 52e', 52f'. It will be understood that the ratchet mechanism may provided in either one of the holes 62c, 62d.

With the thus configurated seat, when the seat is used as a usual seat as shown in FIG. 10, the support members 52e, 52f of the head rest-child's seat member 52 are inserted into the holes 62a, 62b formed at the seat back top section, respectively, so that the member 52 serves as a head rest for a passenger seated on the seat in the state of FIG. 10. When the seat is used for the child, the head rest-child's seat member 52 is fixed on the seat cushion 10 upon the support members 52e, 52f being inserted into the holes 62c, 62d of seat back 12 after the seat back 12 is moved to and fixed at the position as indicated in FIG. 11. In this state, the head rest-child's seat member 52 cannot get out of place under the action of the ratchet mechanism with the grooves 52e, 52f of the support members 52e, 52f if the knobs 60a, 60b are not operated. It will be appreciated that, in this embodiment, there are no levers (48) necessary in the fourth embodiment, thereby reducing a necessary space for the seat and lowering the production cost of the seat. Furthermore, since the head rest-child's seat member 52 is formed by putting up the net 52d, the thickness thereof is considerably reduced, thereby making possible to enlarge the size of the side supporting sections 52a, 52b. This improves an ability of the seat to laterally supporting the child.

Figure 13:
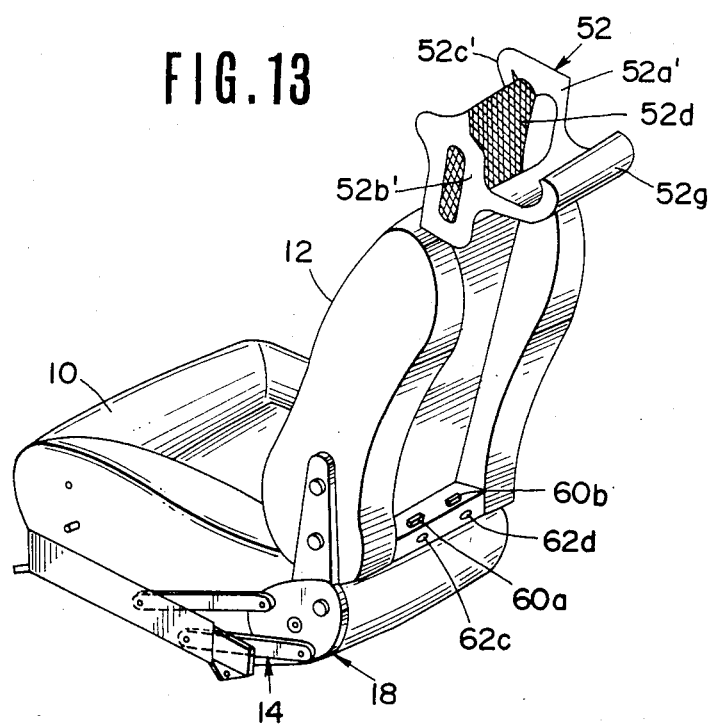
FIG. 13 is a perspective view of a seventh embodiment of the present invention in a usual state.
Figure 14:
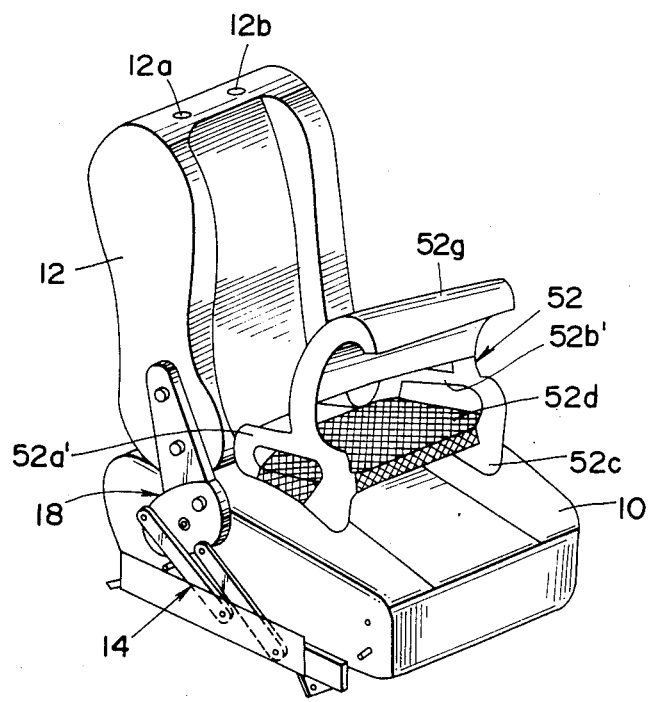
FIG. 14 is a perspective view of the seat of FIG. 13 but showing a state to be used as a seat of the child.

FIGS. 13 and 14 illustrate a seventh embodiment of the seat of the present invention which is similar to the sixth embodiment of FIGS. 10 to 12 except for the shape of the head rest-child's seat member 52. It will be understood this embodiment is the same as the sixth embodiment in the installation manner of the head rest-child's seat member 52 relative to the seat back 12. The head rest-child's seat member 52 of this embodiment is of the type wherein the net 52 is put up on the skeltal frame formed with the side supporting sections 52a', 52b', and the oppositely disposed leg sections 52c'. Additionally, the head rest-child's seat member 52 is formed with the two elongate supporting members (not shown) which corresponding to the supporting members 52e, 52f of FIG. 12, respectively. The two supporting members are insertable into the two holes 62a, 62b, respectively, or into the two holes 62c, 62d, respectively, all of which holes are formed in the seat back 12.

The head rest-child's seat member 52 of this embodiment is further formed with a protection section 52g which is integral with the side supporting sections 52a', 52b' in such a manner as to define between it and the net 52d a space in which the legs of the child seated on the net 52d are to be located in the state as shown in FIG. 14. Accordingly, the front section of the child's upper body can be restrained by the protecting section 52g in the state where the child is seated in position, and therefore the child can be effectively protected at vehicle collision or at sudden deceleration or braking. While no seat belt is shown to be used in FIGS. 13 and 14, it will be understood that any seat belt may be used. In this embodiment, different faces of the net 52d are used according to cases where the head rest-child's seat member 52 used as a head rest or a seat for a child, and therefore there is no unpleasant feeling when the head rest-child's seat member 52 is used as the head rest. Furthermore, in case of the head rest-child's seat member 52 being used as the head rest, it is possible to use the protecting section 52g as a handrail for passengers seated on rear seats during getting on or out of the vehicle.

Figure 15:
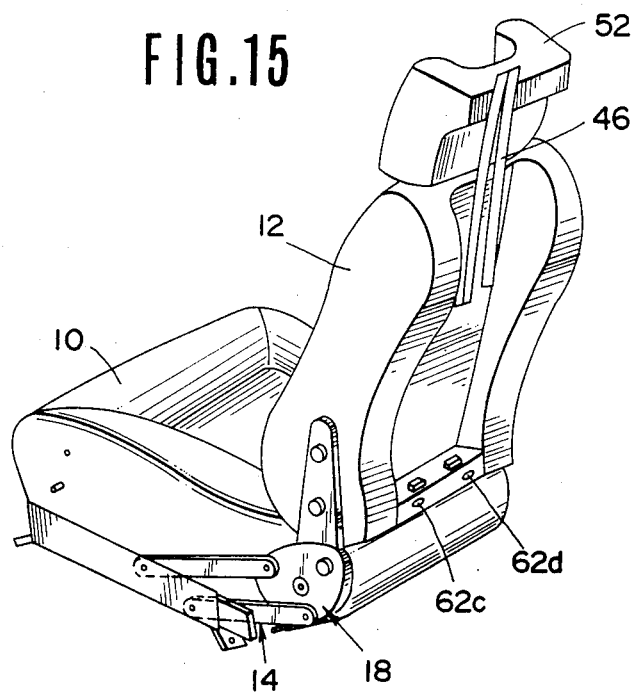
FIG. 15 is a perspective view of an eighth embodiment of the seat of the present invention in a usual state.
Figure 16:
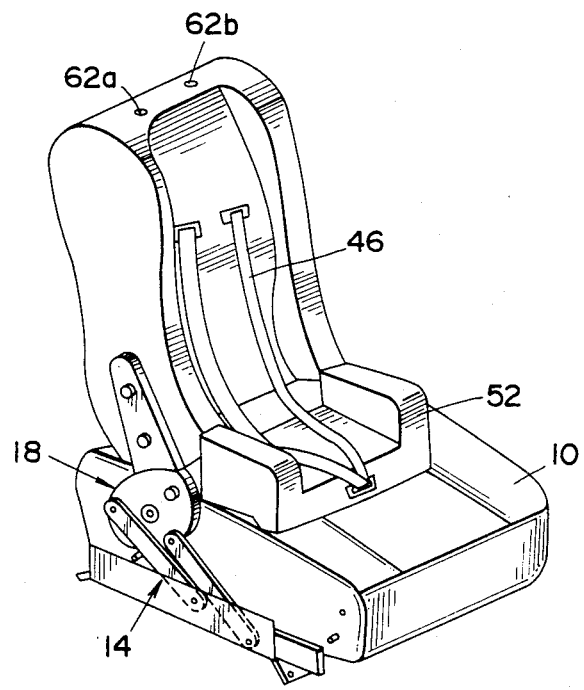
FIG. 16 is a perspective view of the seat of FIG. 15 but showing a state to be used as a seat for a child.

FIGS. 15 and 16 illustrate an eighth embodiment of the seat of the present invention. Also in this embodiment, the head rest-child's seat member 52 has the two elongate supporting members (not shown) corresponding to the members 52e, 52f of FIG. 12, the supporting members being insertable into the holes 62a, 62b, respectively, or into the holes 62c, 62d, respectively, formd in the seat back 12. Accordingly, the head rest-child's seat member 52 is installed and fixed in position as shown in FIG. 15 when the seat is used as usual, or as shown in FIG. 16 when the seat is used as one for the child. In this embodiment, the seat belt assembly 46 is provided consisting of a pair of belts each of which is fixedly connected at one end thereof with the head rest-child's seat member 52 and at the other end thereof with the back side of the seat back 12. Therefore, in case where the seat is used for the child, the child's abdominal region and shoulders can be restrained, thus securely fixing the child in position.

While only two holes 30, 32 have been shown and described to be formed at the side section 10a of the seat cushion 10 for the purpose of fixing the seat back 12 in certain positions, it will be understood that not less than three holes may be formed so as to adjust the fixing positions of the seat back 12 in accordance with the size of a child to be seated on the seat.

Although the holes 30, 32 and the pin 34 engageable therewith have been shown and described to be located on the side of the seat cushion 10 and the side of the link members 20, 22, respectively, it will be appreciated that the pin 34 may be located on the side of the seat cushion 10 while the holes 30, 32 may be located on the side of the link members 20, 22. Otherwise, the link members 20, 22 may be restrained at its side surface by the pin 34.

While the principle of the present invention has been discussed for only mechanisms provided only on one side section of the seat, it will be understood that same mechanism may be provided on the opposite side section of the seat in which the holes 30, 32 and the pin 34 engageable therewith may be omitted on the opposite side section.

Figure 17:
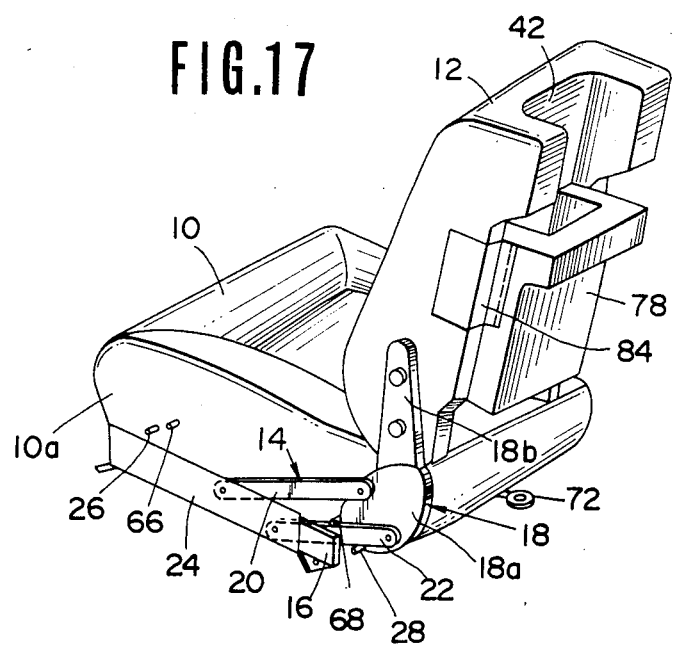
FIG. 17 is a perspective view of a ninth embodiment of the seat of the present invention in a usual state.
Figure 18:
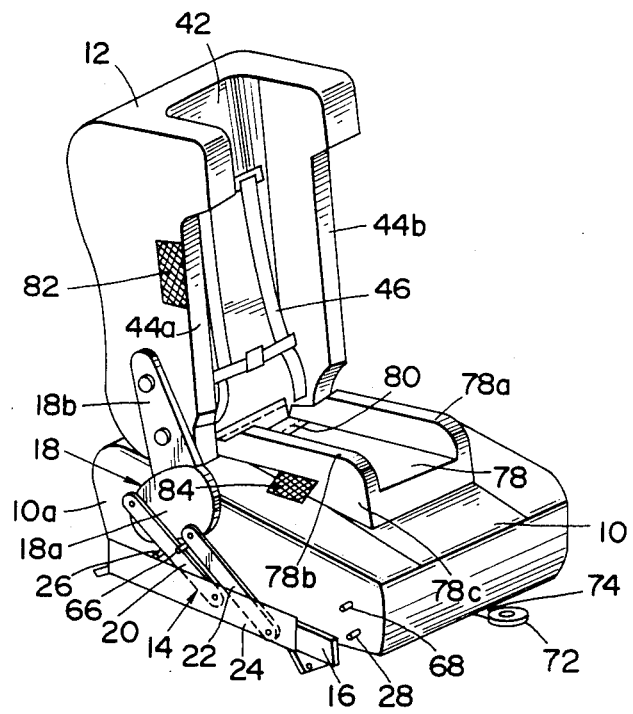
FIG. 18 is a perspective view of the seat of FIG. 17 but showing a state to be used as a seat for a child.
Figure 19:
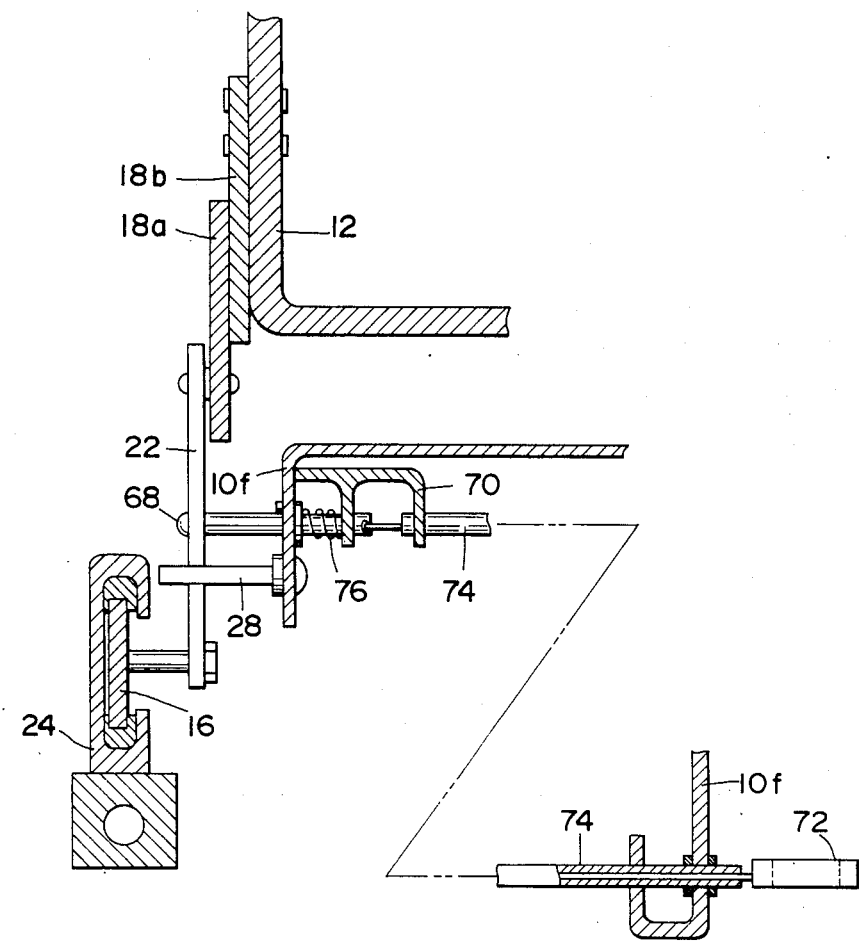
FIG. 19 is a fragmentary vertical sectional view of a mechanism for locking a seat back in position.

FIGS. 17 to 19 illustrate a ninth embodiment of the seat of the present invention. In this embodiment, two pins 66, 68 for fixation purpose are axially movable and provided at the side section 10a of the seat cushion 10 in addition to the two stopper members 26, 28. The pin 66 is located adjacent the stopper member 26 and so adapted that the link member 20 can be put therebetween thereby locking the link member 20 in position as shown in FIG. 18, whereas the pin 68 is located adjacent the stopper member 28 and so adapted that the link member 22 can be put therebetween thereby locking the link member 22 in position as shown in FIG. 17. Thus, the pins 66, 68 constitute in cooperation with the stopper members 26, 28 locking devices, respectively, one of which will be explained in detail with reference to FIG. 19.

The pin 68 is axially movably supported by a frame member 10f of the seat cushion 10 under the action a bracket 70 secured to the frame member 10f, and connected through a cable 74 to a grip 72 which is located to be projected rearward of the seat cushion 10. A spring 76 is provided to always bias the pin 68 to be projected outwardly or leftward in FIG. 19 in which the cable 74 is pulled. The other pin 66 is also connected through the cable 74 to the grip 72 and therefore is also adapted to be axially movable in the same manner as in the pin 68. It will be understood that the pins 66, 68 are simultaneously operated by moving the grip 72.

A seat plate 78 for a child is disposed to be retractable within the groove 42 formed at the back side of the seat back 12, and hingedly fixed to the lower part of the surface of the groove 42 by means of a hinge member 80 made of cloth, so that the seat plate 78 is pivotal around a horizontal axis corresponding to the hinge member 80. The child's seat plate 78 is formed with side supporting sections 78a, 78b which are located opposite to each other to define therebetween a groove (no numeral) for receiving the child. The child's seat plate 78 is further formed with a leg section 78c which is projected opposite to the side supporting sections 78a, 78b. Sticky cloths 82, 84 such as magic tapes are disposed on the surfaces of the seat back 12 and the childs seat plate 78, respectively, and so located that they are contactable with each other when the child's seat plate 78 is retracted or stored within the groove 42 of the seat back 12. Additionally, the seat belt assembly 46 is installed on the bottom surface of the groove 42 of the seat back 12.

The thus configurated seat is operated as follows: In a usual condition where the seat is not used for the child, the seat back 12 is fixed at the rear section of the seat cushion 10 as shown in FIG. 17 in which the link member 22 is put between the stopper member 28 and the pin 32 to be fixed in position. The child's seat plate 78 is being stored within the groove 42 of the seat back 12 and fixed in position under the action of the sticky cloths 84 which are in contact with each other. In this state, the seat can be used completely as a usual seat so that a passenger is seated facing forward. Furthermore, a space defined between the seat back 12 and the child's seat plate 78 is used as a container such as a container such as a magazine rack. The seat belt assembly 46 is stored in this space.

When the child is to be seated, the seat back 12 is moved from the position of FIG. 17 to the other position of FIG. 18 as follows: First, the grip 72 is pulled to withdraw the pin 32 inwardly so as to release the link member 22 from the pin 32. Subsequently, the seat back 12 is pushed forward to take the position of FIG. 18. In this state, the link member 20 is put between the stopper member 26 and the pin 30 and fixed in position as shown in FIG. 18. Thereafter, the sticky cloth 84 is peeled off from the sticky cloth 82, and then the child's seat plate 78 is pivotally moved downwardly around the hinge member 80 to be used as a seat for the child as shown in FIG. 18. In this state, the child is seated on the child's seat plate 78 and restrained by the seat belt assembly 46. The upper body of the thus seated child is supported within the groove 42 of the seat back 12 in which the back of the child is supported on the bottom surface of the groove 42 while the lateral movement of the child is restricted by the side supporting sections 44a, 44b. It will be understood that the waist of the child is laterally supported by the side supporting sections 78a, 78b of the seat plate 78. Furthermore, the child's seat plate 78 can raise the child's visual point, thereby enabling the child to see the outside of the vehicle.

Figure 20:
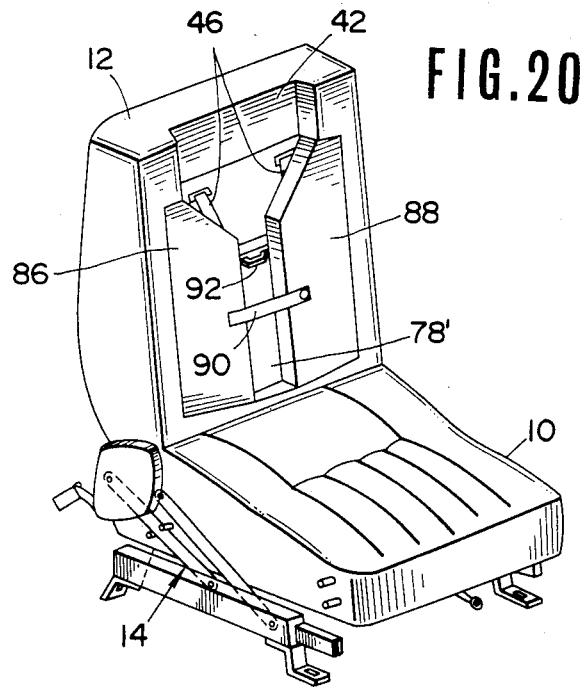
FIG. 20 is a perspective view of a tenth embodiment of the seat of the present invention in a state where a seat plate for a child is retracted.
Figure 21:
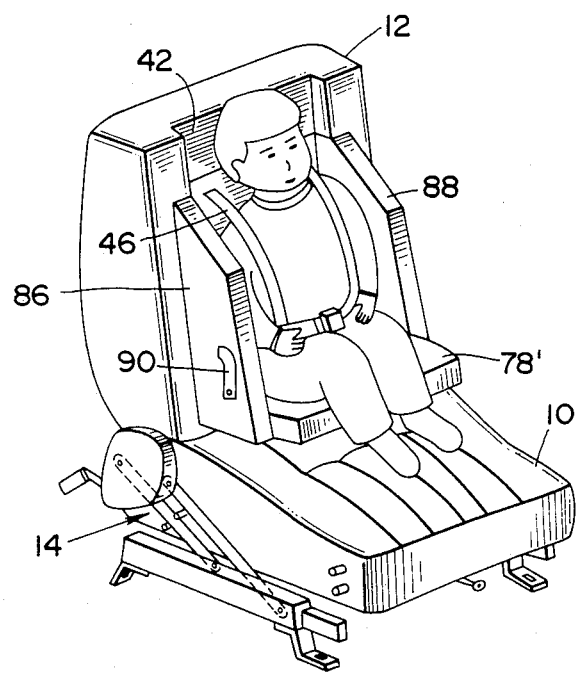
FIG. 21 is a perspective view of the seat of FIG. 20 but showing a state in which a child is seated in position.
Figure 22:
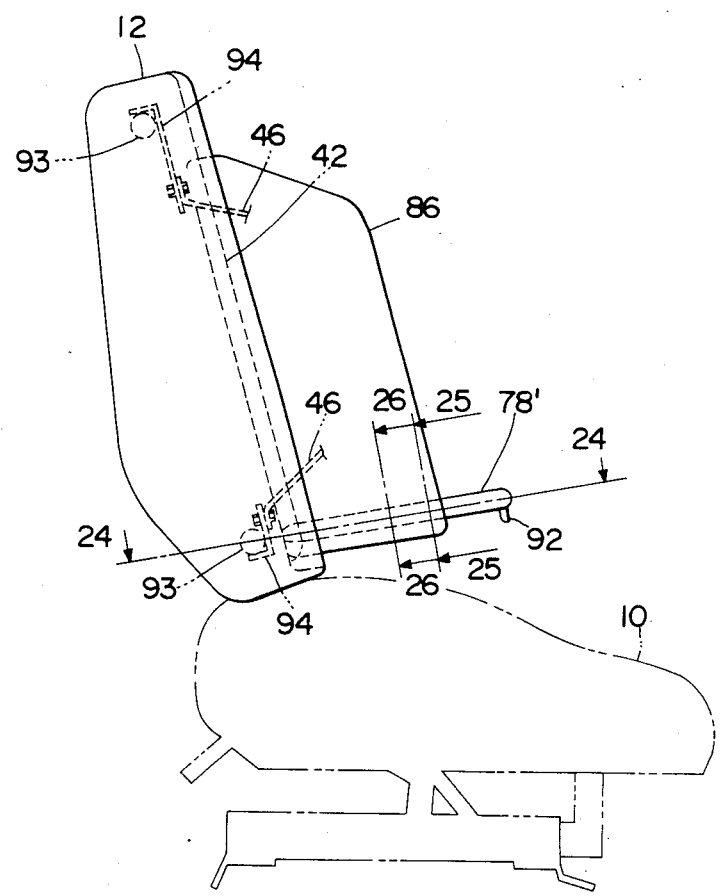
FIG. 22 is a side elevation, partly in phantom, of the seat of FIG. 20 in a state to be used as a seat for a child.
Figure 23:
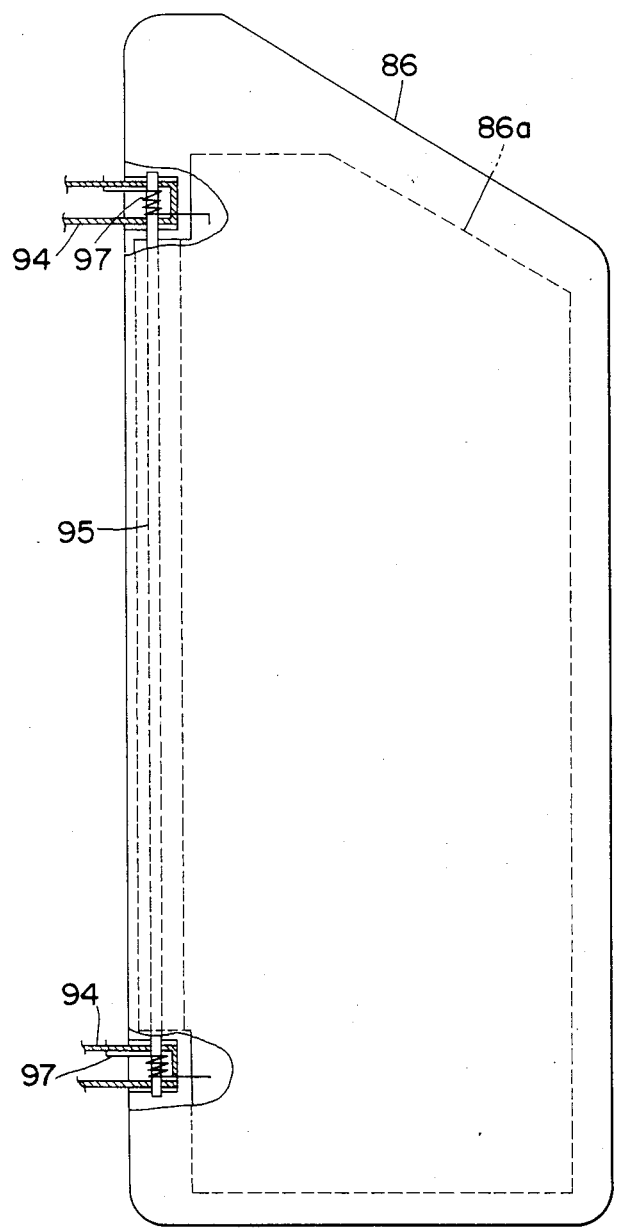
FIG. 23 is a side elevation, partly in section, showing a mechanism for supporting a side supporting member of the seat of FIG. 20.

FIG. 20 illustrate a tenth embodiment of the seat of the present invention which is the same as the ninth embodiment of FIGS. 17 to 19 with the exception that a pair of retractable side supporting members 86, 88 are provided in addition to the child's plate 78' as foldable or retractable members. In this embodiment, the child's seat plate 78' and the side supporting members 86, 88 are disposed to be able to be stored upon being folded or retracted within the groove 42 of the seat back 12 as shown in FIG. 20. The child's seat plate 78' of this embodiment is of the flat plate type and pivotally connected to the seat back 12 so as to be pivotal around a substantially horizontal axis corresponding to the connection portion of the child's seat plate with the seat back 12. The side supporting members 86, 88 are the flat plate type and pivotally connected to the seat back 12 so as to be pivotal around a generally vertical axis corresponding to the connection portion of each side supporting member with the seat back. In order to store the foldable members, first the child's seat plate 78' is folded in the seat back groove 42, and subsequently the side supporting members 86, 88 are closed. The thus closed side supporting members 86, 88 are maintained at their closed state under the action of a band 90 with a button as a fastener. In order to unfold the foldable members, the band 90 is taken off, and then a pull 92 disposed on the bottom surface of the child's seat plate 78' is pulled toward an operator. The child can be seated on the thus set child's seat plate 78' as shown in FIG. 21 in which the seat back 12 has been already moved to the position to be used as the seat for the child.

The manner of installing the side supporting members 86, 88 to the seat back 12 will be described in detail with reference to FIGS. 22 to 26. An elongate rod or axis 95 is supported by brackets 94 fixedly connected to a frame 93 of the seat back 12. A core plate member 86a of the side supporting member is rotatably mounted at its one edge section. The elongate rod 95 is provided with springs 97 which always bias the side supporting member 86 in the direction to cause the side supporting member to be folded retracted. The other side supporting member 88 is also similarly arranged to be always biased in the direction to be folded or retracted.

Figure 24:
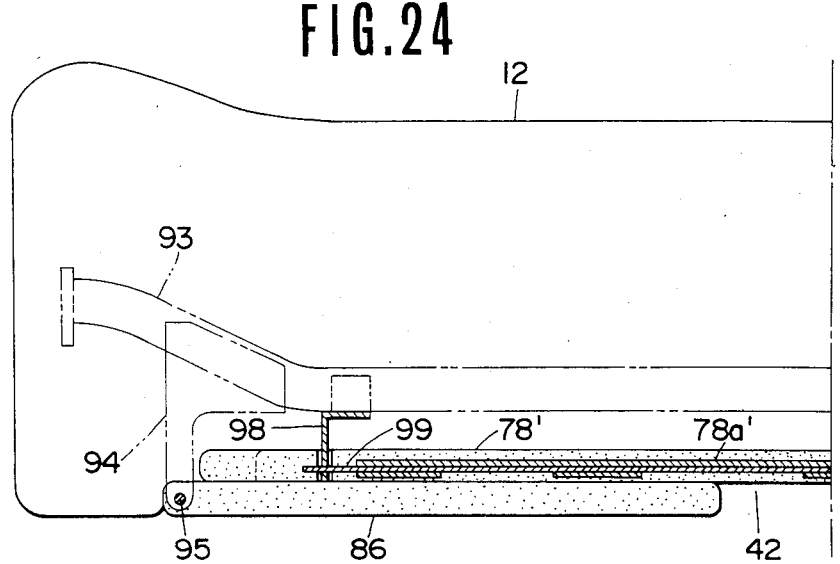
FIG. 24 is a fragmentary sectional view taken in the direction of arrows substantially along the line of 24—24 of FIG. 22.
Figure 25:
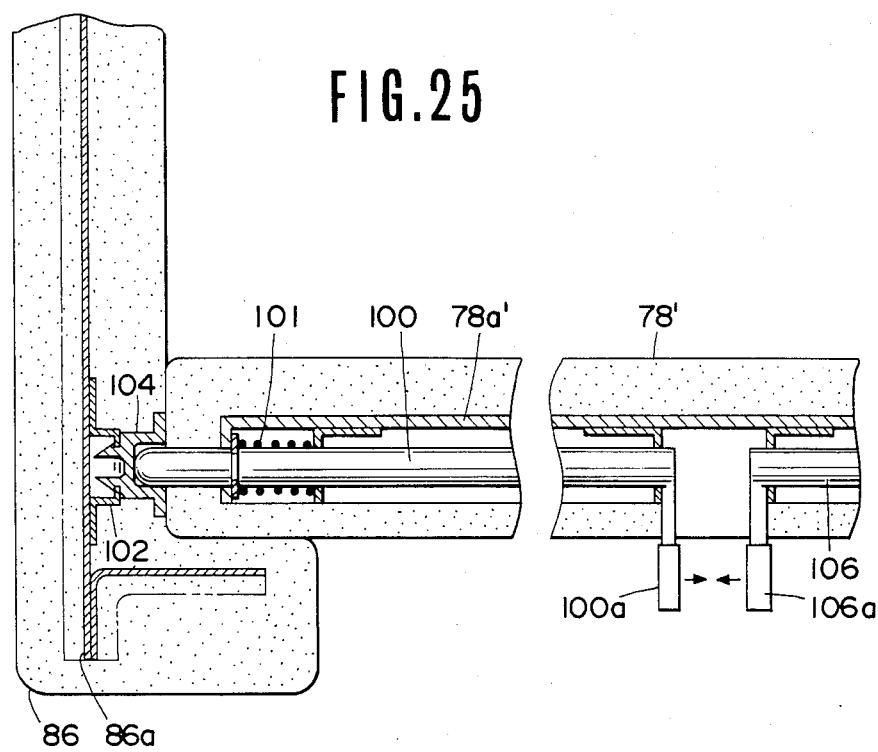
FIG. 25 is a fragmentary sectional view taken in the direction of arrows substantially along the line 25—25 of FIG. 22.
Figure 26:
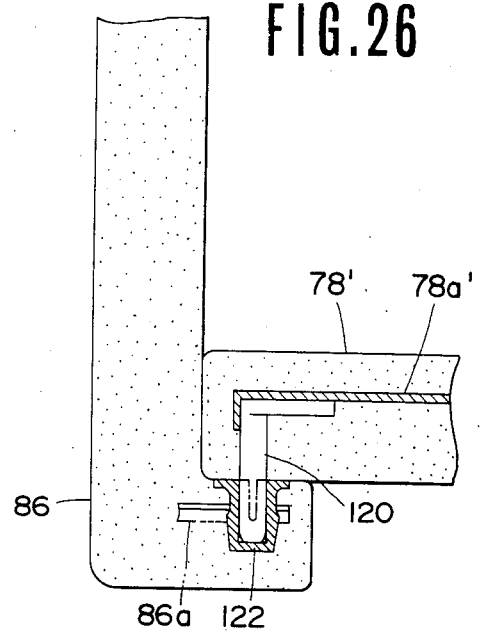
FIG. 26 is a fragmentary sectional view taken in the direction of arrows of 26—26 of FIG. 22.

The child's seat plate 78' is installed to the seat back 12 as shown in FIG. 24. An elongate rod 99 is supported by a bracket 98 fixedly connected to the frame 93 of the seat back 12. A core plate member 78a' is rotatably mounted at its edge section on the elongate rod 99. The child's seat plate 78' is adapted to be set at its unfolded fixed position by a mechanism as shown in FIGS. 25 and 26. As illustrated in FIG. 25, the core plate member 78a' of the child's seat plate 78' is provided with a rod member or axis 100 for fixation purpose in such a manner as to pass through a bend portion of the core plate member 78a'. The rod member 100 is axially movable by operating a knob 100a and always biased leftward in FIG. 25 under the action of a spring 101. A socket 104 is securely connected through a bracket 102 with the core plate member 86a of the side supporting member 86. The rod member 100 can be engaged at its tip end with the socket 104.

Additionally, as illustrated in FIG. 26, a pin 120 for fixation purpose is securely installed to the child's seat plate core plate member 78a' on the bottom surface side. The pin 120 is engageable with a socket 122 secured to the core plate member 86a of the side supporting member 86. Consequently, the child's seat plate 78' is fixed in the unfolded position in the state where the rod member 100 is brought into engagement with the socket 122. In order to fold in the child's seat plate 78', the knob 100a is operated to cause the rod member 100 rightward in FIG. 25. As shown in FIG. 25, another rod member 106 similar to the rod member 100 is disposed in alignment with the rod member 100 in such a manner that the knobs 100a and 106a are located near each other. It will be understood that a pin and a socket respectively corresponding to the pin 120 and the socket 122 are disposed generally symmetrically with the pin 120 and the socket 122 though not shown.

With the thus configurated seat, in a usual condition in which the seat is not used for the child, the seat back 12 is fixed in the position of the rear section of the seat cushion 10, and the child's seat plate 78' and the side supporting members 86, 88 are folded in. In this state, a passenger can be seated on the seat facing forward as usual. When the child is to be seated on the seat, first the seat back 12 is moved forward to take the position corresponding to the front section of the seat cusion 10. Subsequently, the band 90 is taken off to pull the pull 92, so that the child's seat plate 78' is separated from the groove 42 and unfolded, pushing the side supporting members 86, 88 to be opened. When the child's seat plate 78' is pivotally moved to a generally horizontal position, the rod member 100 is brought into engagement with the socket 104 under the action of the spring 101 while the pin 120 fits in the socket 122. Thus, location and fixation of the child's seat plate 78' can be securely accomplished. Thereafter, the child is seated on the child's seat plate 78' and restrained by the seat belt assembly 46. Accordingly to this embodiment, the side supporting members 86, 88 for achieving child's support in the lateral direction are enlarged in size as compared with the corresponding sections 78a, 78b of the ninth embodiment of FIGS. 17 to 19, thereby attaining a further secure support for the child.

Figure 27:
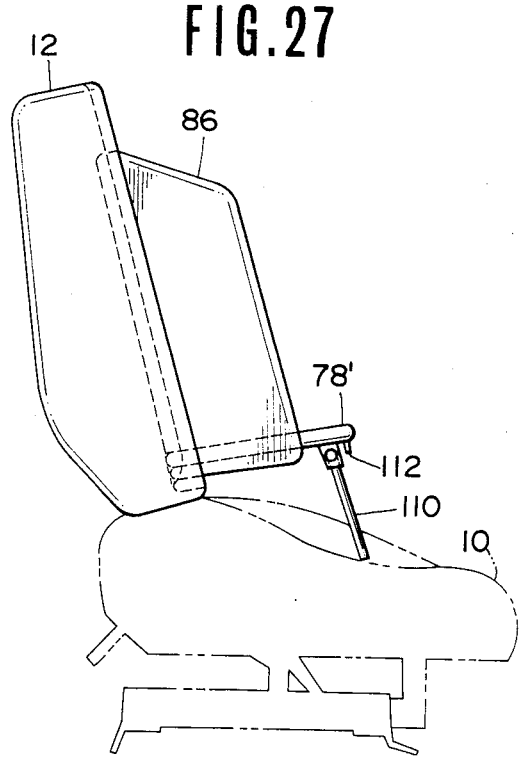
FIG. 27 is a side elevation, partly in phatom, of an eleventh embodiment of the seat of the present invention.
Figure 28:
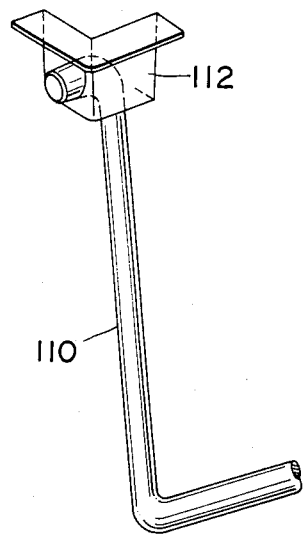
FIG. 28 is a perspective view of a support member used for supporting a seat plate for the child on a seat cushion, used in the seat of FIG. 27.

FIGS. 27 and 28 illustrate an eleveth embodiment of the seat of the present invention which is the same as the tenth embodiment with the exception that a leg member 110 is additionally provided to support the child's seat plate 78 on the seat cushion 10. As shown, the leg member 110 is pivotally installed through a bracket 112 to the child's seat plate 78' on the bottom surface side. The leg member 110 is adapted to closely contact with the bottom surface of the child's seat member in the state the child's seat member 78' is folded in. The leg member 110 is pivotally moved to a position as shown in FIG. 27 in when the child's seat plate 78' is unfolded to use the seat for the child. It is to be noted that the leg member 110 is adapted not to rotate over a predetermined angle upon contacting with the bracket 112. In this embodiment, the weight of the child seated on the child's seat plate 78' is supported also by the seat cushion 10, thereby attaining a further secure support of the child while providing a stronger support strength of the child's seat plate 78'.

FIGS. 29A to 30B illustrate a twelfth embodiment of seat of the present invention. This embodiment is the same in the inventive principle as the aforementioned various embodiments but slightly different in the configuration of a mechanism for supporting and locking the seat back 12 in the certain positions. In this embodiment, two pins 130, 132 are provided at the side section 10a of the seat cushion 10 and rigidly connected to the frame (not shown) of the seat cushion 10. As shown, the pin 130 is located in the generally middle part of the seat cushion side section in the fore and aft direction of the seat, while the pin 132 is located in the rear part of the seat cushion side section.

Two generally C-shaped ratchet or catch members 134, 136 are pivotally mounted on the fixed arm or base member 18a of the reclining device 18 in such a manner as to be engageable with the pins 130, 132, respectively. It is to be noted that each ratchet member 134, 136 is so engaged with the pin 130, 132 as to nearly surround the pin, thus fixing the engagement between the ratchet member and the pin. Accordingly, the engagement between the ratchet member 134, 136 and the pins 130, 132 cannot be released even when a force is applied to the seat back 12 to move it from one position to the other position. In other words, the ratchet member 134, 136 and the pin 130, 132 constitute a mechanism which functions to support and locking the seat back 12 and locking in the certain positions.

The ratchet members 134, 136 are connected through a cable or wire 140 with an operating lever (not shown) which can be moved by an operator. Accordingly, when the ratchet member 134, 136 moved upward through the cable 140, the ratchet member 134, 136 can be released from the pin 130, 132. In addition, the seat back 12 of this embodiment is provided at its top section with a head rest 142, and the back side thereof with the seat belt assembly 46. The seat belt assembly 46 consists of the shoulder belts 46c connected to an abdominal region supporting member 46f which connectable through a buckle 46a with the rearmost face of the seat cushion 10.

Figure 29A:
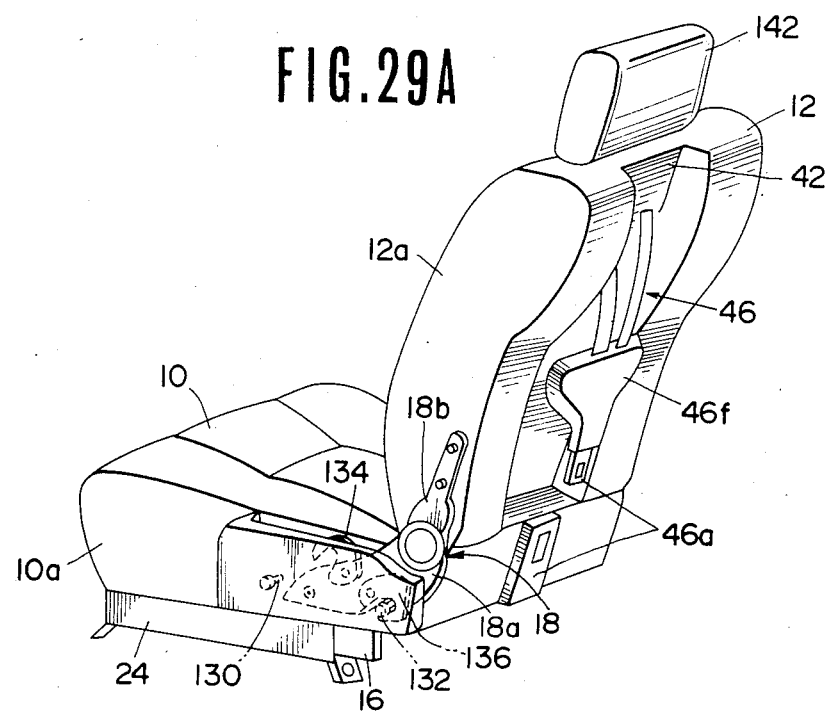
FIG. 29A is a perspective view of a twelfth embodiment of the present invention in a usual state.
Figure 29B:
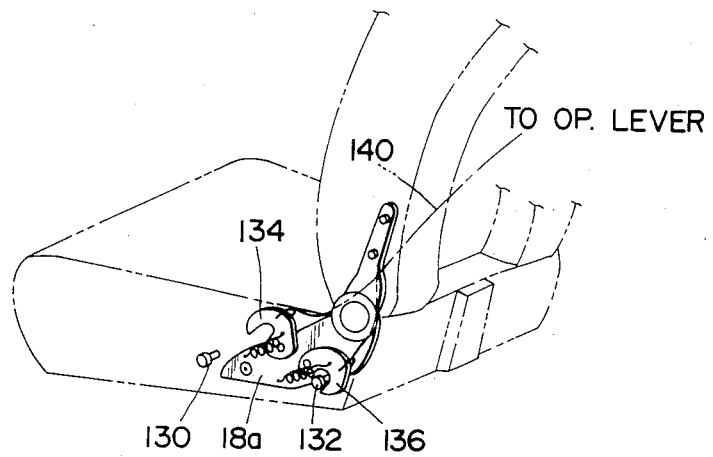
FIG. 29B is a fragmentary perspective view showing a mechanism for supporting and locking a seat back in the usual state.
Figure 30A:
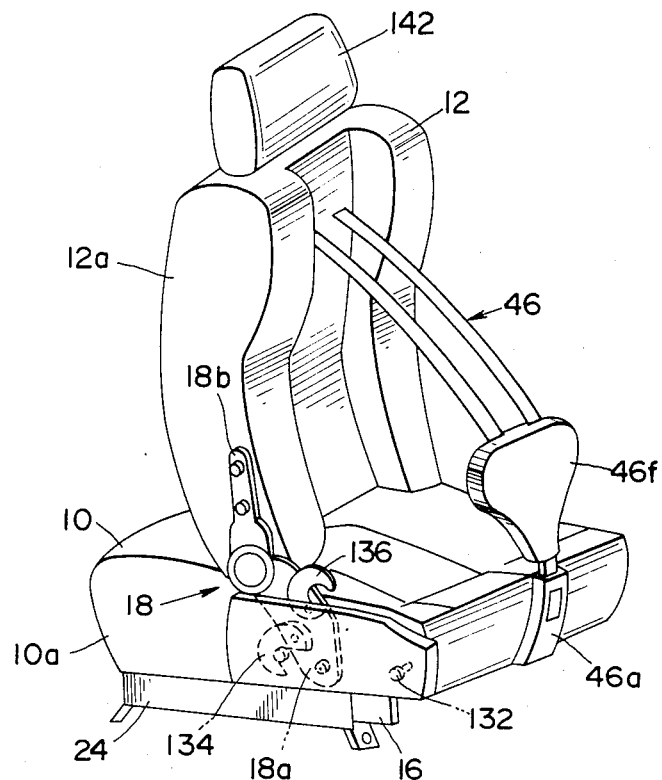
FIG. 30A is a perspective view of the seat of FIG. 29A but showing a state to be used as a seat for a child.
Figure 30B:
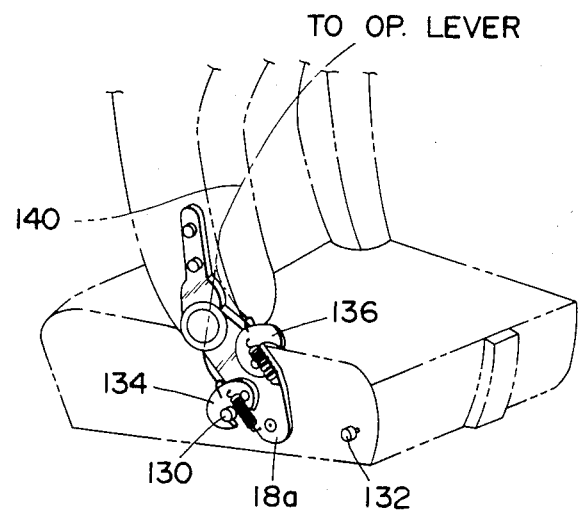
FIG. 30B is a fragmentary perspective view similar to FIG. 29B but showing the state to be used as the seat for the child.

With the thus configurated seat, in a usual condition in which the seat is not used for the child, the seat back 12 supported and fixed in the position as shown in FIGS. 29A and 29B in which the ratchet member 136 is engaged with the pin 132 while the ratchet member 134 is released from the pin 130. In this a state, a passenger can be seated on the seat facing forward as usual. When the seat is to be used for the child, the ratchet members 134, 136 are moved upward through the cable 140 by the operator to release the ratchet member 136 from the pin 132. Then, the seat back 12 is moved into the position as shown in FIGS. 30A and 30B, so that the ratchet 134 is brought into engagement with the pin 130, thus allowing the seat back 12 to be securely supported and fixed in the position as shown in FIGS. 30A, 30B.

While the seat back supporting and fixing mechanism consists of the integers 18, 130, 132, 134, 136, 140 has been shown as being provided on one side section of the seat, it will understood that the same mechanism may be provided on the opposite side section to the above-mentioned side section 10a.

What is claimed is:

1. A vehicular seat comprising:
   a seat cushion;
   a seat back;
   means for supporting said seat back movably in forward and rear directions relative to said seat cushion;
   means for locking said seat back in at least a first position and a second position relative to said seat cushion, a back side of said seat back forming part of a seat for a child in said first position, said first position being located forward of said second position which is located in a rear section of said seat cushion; and
   means for restraining the body of said child relative to the back side of said seat back in said first position of said seat back, wherein said restraining means includes means defining on the back side of said seat back a groove within which upper body of said child is supported, and a seat belt assembly connected to the back side of said seat back to restrain the child upper body relative to said seat back.

2. A vehicular seat as claimed in claim 1, wherein said seat back is generally C-shaped in cross-section to which longitudinal axis of said seat back is perpendicular, whereby said groove is defined on the back side of said seat back.

3. A vehicular seat comprising:
   a seat cushion;
   a seat back;
   means for supporting said seat back movably in forward and rear directions relative to said seat cushion;
   means for locking said seat back in at least a first position and a second position relative to said seat cushion, a back side of said seat back forming part of a seat for a child in said first position, said first position being located forward of said second position which is located in a rear section of said seat cushion; and
   means for restraining the body of said child relative to the back side of said seat back in said first position of said seat back, wherein said supporting means includes a first link member, and a second link member located rearward relative to said first link member in said forward and rear directions, each link member having a first end section pivotally fixed to a base member connected to said seat back 12, and a second end section pivotally fixed to an elongate stationary member which extends in the forward and rear directions and substantially stationary relative to said seat cushion, said supporting means further includes first and second stopper members fixed to said seat cushion and projecting from the side section of said seat cushion, said first stopper member being located forward relative to said second stopper member in said forward and rear directions and engageable with said first link member, said second stopper member being located at a rear portion of said side section of said seat cushion and engageable with said second link member.

4. A vehicular seat as claimed in claim 3, wherein said base member forms part of a reclining device to change the angle of said seat back relative to said seat cushion, said reclining device including a movable member fixed to said seat back and pivotally connected to said base member.

5. A vehicular seat as claimed in claim 3, wherein said locking means includes means defining first and second holes in the side section of said seat cushion, said first hole being loated forward relative to said second hole in said forward and rear directions, and a locking pin axially movably supported by said base member and engageable with said first and second holes.

6. A vehicular seat as claimed in claim 3, wherein said first stopper is located at front portion of the side section of said seat cushion in said forward and rear directions.

7. A vehicular seat as claimed in claim 3, wherein said first stopper is located at a middle portion of the side section of said seat cushion in said forward and rear directions.

8. A vehicular seat comprising:
   a seat cushion;
   a seat back;
   means for supporting said seat back movably in forward and rear directions relative to said seat cushion;
   means for locking said seat back in at least a first position and a second position relative to said seat cushion, a back side of said seat back forming part of a seat for a child in said first position, said first position being located forward of said second position which is located in a rear section of said seat cushion; and
   means for restraining the body of said child relative to the back side of said seat back in said first position of said seat back, further comprising a cushion member fixable to said seat back and taking a first position to serve as a head rest and a second position to serve as a seat for a child.

9. A vehicular seat comprising:
   a seat cushion;
   a seat back;
   means for supporting said seat back movably in forward and rear directions relative to said seat cushion;
   means for locking said seat back in at least a first position and a second position relative to said seat cushion, a back side of said seat back forming part of a seat for a child in said first position, said first position being located forward of said second position which is located in a rear section of said seat cushion; and means for restraining the body of said child relative to the back side of said seat back in said first position of said seat back, wherein said supporting means includes a first link member, and a second link member located rearward relative to said first link member in said forward and rear directions, each link member having a first end section pivotally fixed to a base member connected to said seat back, and a second end section pivotally fixed to an elongate stationary member which extends in the forward and rear directions and substantially stationary relative to said seat cushion, said supporting means further includes first and second stopper members fixed to said seat cushion and projecting from the side section of said seat cushion, said first stopper member being located forward relative to said second stopper member in said forward and rear directions and engageable with said first link member, said second stopper member being located at a rear portion of said side section of said seat cushion and engageable with said second link member, wherein said locking means includes first and second locking pins axially movably supported by said seat cushion and outwardly projectable from the side section of said seat cushion, said first locking pin being located near said first stopper member and engageable with said first link member to put said first link memer between said first stopper member and said first locking pin, said second locking pin being located near said second stopper member and engageable with said second link member to put said second link member between said second stopper member and said second locking pin, and means for manually causing said first and second locking pins to disengage with said first and second link members, respectively.

10. A vehicular seat comprising:
a seat cushion;
a seat back;
means for supporting said seat back movably in forward and rear directions relative to said seat cushion;
means for locking said seat back in at least a first position and a second position relative to said seat cushion, a back side of said seat back forming part of a seat for a child in said first position, said first position being located forward of said second position which is lcoated in a rear section of said seat cushion; and
means for restraining the body of said chld relative to the back side of said seat back in said first position of said seat back, wherein said supporting means includes first and second support pins fixed to said seat cushion and projecting outwardly from the side section of said seat cushion, said first support pin being lcoated forward of said second support pin in said forward and rear directions, and first and second ratchet members each of which has a first end section which is pivotally fixed to a base member connected to said seat back and pivotally fixed to the side section of said seat cushion, said first and second ratchet members being engageable with said first and second support pins, respectively.

11. A vehicular seat as claimed in claim 8, wherein said cushion member is formed with a groove for receiving head of a passenger in said first position while receiving body of said child in said second position.

12. A vehicular seat as claimed in claim 11, said cushion member is pivotally connected through an extendable lever with said seat back.

13. A vehicular seat as claimed in claim 12, wherein said extendable lever is formed with a crank-shaped curved section engageable with a first groove formed in a top section of said seat back to lock said cushion member in said first position, and with a second groove formed in a lower section of said seat back to lock said cushion member in said second position.

14. A vehicular seat as claimed in claim 12, wherein said cushion member is provided with two support rod members which are respectively engageable with two holes formed in a top section of said seat back to lock said cushion member in said first position.

15. A vehicular seat as claimed in claim 11, wherein said cushion member is formed with a leg section which is contactable with said seat cushion when said cushion member takes said first position.

16. A vehicular seat as claimed in claim 8, wherein said cushion member includes a skeletal frame, and a net put on said skeletal frame, said skeletal frame having two support rod members which are respectively engageable with the first two holes formed in a top section of said seat back in said first position of said cushion member and with the second two holes formed in a lower portion of the back side of said seat back.

17. A vehicular seat as claimed in claim 16, further comprising means for locking said cushion member in said second position, said locking means including means capable of fixing said two support rod members in said second two holes.

18. A vehicular seat comprising:
a seat cushion;
a seat back;
means for supporting said seat back movably in forward and rear directions relative to said seat cushion;
means for locking said seat back in at least a first position and a second position relative to said seat cushion, a back side of said seat back forming part of a seat for a child in said first position, said first position being located forward of said second position which is located in a rear section of said seat cushion; and
means for restraining the body of said child relative to the back side of said seat back in said first position of said seat back, further comprising a seat plate for a child, retractable in a seat back groove, said seat back plate being hingedly fixed to the back side of said seat back and supportable on said seat cushion when said seat plate is placed in an operative position in which said child is seated on said seat plate.

19. A vehicular seat as claimed in claim 18, wherein said seat plate is formed with a groove for receiving waist of said child when said seat plate is put in said operative position.

20. A vehicular seat as claimed in claim 19, wherein said seat plate is formed with a leg section which is contactable with said seat cushion in said operative position of said seat plate.

21. A vehicular seat as claimed in claim 18, further comprising two side supporting members for restricting lateral movement of upper body of said child in said operative position of said seat plate, said side supporting members being hingedly fixed to the back side of said seat back and located oppositely on opposite sides of said seat plate, said side supporting members being retractable to be folded on said seat plate in said operative position of said seat plate.

22. A vehicular seat as claimed in claim 21, further comprising means for securely supporting said seat plate relative to said side supporting members.

23. A vehicular seat as claimed in claim 22, further comprising a support member for supporting said seat plate on said seat back, said support member being pivotally connected to said seat plate to be retractable in said operative position of said seat plate.

24. A vehicular seat as claimed in claim 10, wherein said first support pin is located at a generally middle portion of said side section of said seat cushion in said forward and rear directions while said second support pin is located at a rear portion of the side section of said seat cushion in said fore and aft direction.

25. A vehicular seat as claimed in claim 10, wherein each ratchet member is generally C-shaped to tightly catch said support pin when engaged with said support pin, whereby each support pin and each ratchet member also constitute said locking means.

26. A vehicular seat as claimed in claim 24, wherein each ratchet member has a second end section which is curved to prevent said ratchet member from releasing from said support pin upon engagement of said ratchet member with said support pin.

27. A vehicular seat as claimed in claim 10, further comprising means for releasing each ratchet member from said support pin.

28. A vehicular seat as claimed in claim 27, wherein said releasing means includes a cable connected to said first and second each ratchet member to release from said support pin.

29. A vehicular seat as claimed in claim 10, wherein said base member forms part of a reclining device to change angle of said seat back relative to said seat cushion, said reclining device including a movable member fixed to said seat back and pivotally connected to said base member.

* * * * *